(12) United States Patent
Dos Santos Fegadolli et al.

(10) Patent No.: US 9,091,807 B2
(45) Date of Patent: Jul. 28, 2015

(54) COMPACT TUNABLE PHOTONIC CRYSTAL NANOBEAM CAVITY WITH LOW POWER CONSUMPTION

(71) Applicant: CALIFORNIA INSTITUTE OF TECHNOLOGY, Pasadena, CA (US)

(72) Inventors: William Dos Santos Fegadolli, Pasadena, CA (US); Axel Scherer, Barnard, VT (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/051,409

(22) Filed: Oct. 10, 2013

(65) Prior Publication Data

US 2014/0161386 A1 Jun. 12, 2014

Related U.S. Application Data

(60) Provisional application No. 61/736,379, filed on Dec. 12, 2012.

(51) Int. Cl.
| | |
|---|---|
| *G02B 6/12* | (2006.01) |
| *G02B 6/122* | (2006.01) |
| *B82Y 20/00* | (2011.01) |
| *G02B 6/10* | (2006.01) |

(52) U.S. Cl.
CPC .............. *G02B 6/1225* (2013.01); *B82Y 20/00* (2013.01); *G02B 6/1228* (2013.01); *G02B 6/107* (2013.01)

(58) Field of Classification Search
CPC ....................................................... G02B 6/1228

USPC ............................................................ 372/92
See application file for complete search history.

(56) References Cited

U.S. PATENT DOCUMENTS

| | | | | |
|---|---|---|---|---|
| 5,838,870 | A * | 11/1998 | Soref ............................. | 385/131 |
| 6,532,326 | B1 * | 3/2003 | Hutchinson et al. ............ | 385/37 |
| 7,391,801 | B1 * | 6/2008 | Soref et al. ...................... | 372/92 |
| 7,561,761 | B2 * | 7/2009 | Sigalas et al. ..................... | 385/8 |
| 7,603,016 | B1 | 10/2009 | Soref | |
| 2002/0021878 | A1 * | 2/2002 | Allan et al. .................... | 385/129 |
| 2004/0184752 | A1 * | 9/2004 | Aoki et al. ..................... | 385/123 |
| 2005/0084213 | A1 * | 4/2005 | Hamann et al. ................. | 385/40 |
| 2005/0179986 | A1 * | 8/2005 | Gothoskar et al. ............. | 359/321 |
| 2007/0077015 | A1 * | 4/2007 | Aoki et al. ..................... | 385/125 |
| 2008/0013903 | A1 | 1/2008 | Fujii et al. | |
| 2008/0089640 | A1 * | 4/2008 | Beausoleil ...................... | 385/24 |
| 2011/0007761 | A1 | 1/2011 | Assefa et al. | |
| 2012/0099817 | A1 * | 4/2012 | Quan et al. ..................... | 385/33 |

(Continued)

FOREIGN PATENT DOCUMENTS

JP        2007-334236        12/2007

OTHER PUBLICATIONS

International Search Report and Written Opinion mailed on Jan. 24, 2014 for International Application No. PCT/US2013/064413 filed on Oct. 10, 2013.

(Continued)

*Primary Examiner* — Charlie Y Peng
(74) *Attorney, Agent, or Firm* — Steinfl & Bruno LLP

(57) ABSTRACT

Methods and devices for a tunable photonic crystal nanobeam cavity are disclosed. Such nanobeam cavity has high Q-factor and can be integrated with a microheater. The resonant wavelength of the cavity can be tuned to attain a high modulation depth with low power consumption.

12 Claims, 6 Drawing Sheets

(56) References Cited

U.S. PATENT DOCUMENTS

2012/0301075 A1* 11/2012 Wang et al. .................. 385/28
2013/0176554 A1* 7/2013 Loncar et al. ................. 356/51

OTHER PUBLICATIONS

V. R. Almeida, et al., "All-optical control of light on a silicon chip," Nature, 431, 1081-1084 (2004).

V. R. Almeida, et al., "Nanotaper for compact mode conversion," Optics Letters, 28, (15) 1302-1304 (2003).

V.R. Almeida, et al., "Optical bistability on a silicon chip", Optics Letters, 29, (20) 2387-2389 (2004).

T. Claes, et al., "Vernier-cascade label-free biosensor with integrated arrayed waveguide grating for wavelength interrogation with low-cost broadband source" Optics Letters, 36, (17) 3320-3322 (2011).

P.B. Deotare, et al., "All optical reconfiguration of optomechanical filters", Nature Communications, 3:846 (2012), 8 pages.

P.B. Deotare, et al., "High quality factor photonic crystal nanobeam cavities", Applied Physics Letters, 94, 121106-1 to 121106-3 (2009).

W.S. Fegadolli, et al., "Highly linear electro-optic modulator based on ring resonator", Microwave and Optical Technology Letters, 53, (10) 2375-2378 (2011).

W.S. Fegadolli, et al., "Reconfigurable silicon thermo-optical device based on spectral tuning of ring resonators", Optics Express, 19, (13) 12727-12739 (2011).

W.S. Fegadolli, et al., "Reconfigurable silicon thermo-optical ring resonator switch based on Vernier effect control", Optics Express, 20, (13) 14722-17433 (2012).

J.S. Foresi, et al., "Photonic-bandgap microcavities in optical waveguides", Nature, 390, 143-145 (1997).

L. Haret, et al., "Extremely low power optical bistability in silicon demonstrated using 1 D photonic crystal nanocavity", Optics Express, 17, 21103-21112 (2009).

M.W. McCutcheon, et al., "Design of a silicon nitride photonic crystal nanocavity with a Quality factor for one million for coupling to a diamond nanocrystal", Optics Express, 16, (23) 19136-19145 (2008).

R. Perahia, et al., "Electrostatically tunable optomechanical 'zipper' cavity laser", Applied Physics Letters, 97, 191112-1 to 191112-3 (2010).

B. Schmidt, et al., "Nanocavity in a silicon waveguide for ultra-sensitive nanoparticle detection", Applied Physics Letters, 85, (21) 4854-4856 (2004).

D.K. Sparacin, et al., "Silicon waveguide sidewall smoothing by wet chemical oxidation," IEEE J. Lightwave Tech., 23, (8) 2455-2461 (2005).

D.J. Thomson, et al., "High contrast 40Gbit/s optical modulation in silicon," Optics Express, 19, (12) 11507-11516 (2011).

X. Wang, et al., "On-chip silicon photonic wavelength control of optical fiber lasers", Optics Express, 16, (20) 15671-15676 (2008).

F. Xia, et al., "Ultra-compact high order ring resonator filters using submicron silicon photonic wires for on-chip optical interconnects", Optics Express, 15, (19) 11934-11941 (2007).

Q. Xu, et al., "Micrometer-scale silicon electro-optic modulator," Nature, 435, 325-327 (2005).

* cited by examiner

COMPACT TUNABLE PHOTONIC CRYSTAL NANOBEAM CAVITY WITH LOW POWER CONSUMPTION

CROSS REFERENCE TO RELATED APPLICATIONS

The present application claims priority to U.S. Provisional Patent Application No. 61/736,379, filed on Dec. 12, 2012, the disclosure of which is incorporated herein by reference in its entirety.

TECHNICAL FIELD

The present disclosure relates to photonic crystals. More particularly, it relates to devices and methods for a compact photonic crystal nanobeam cavity with low power consumption.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

In a first aspect of the disclosure, a device is described, comprising: a substrate; a nanobeam cavity element on the substrate, wherein the nanobeam cavity element comprises a row of periodically spaced holes; a waveguide element on the substrate; a spacing element, separating the waveguide element from the nanobeam cavity element; a spacing layer, covering the nanobeam cavity element, the waveguide element, and the spacing element; and a heater element on the spacing layer.

DETAILED DESCRIPTION

Silicon photonics is considered a promising technology, mainly due to the intrinsic characteristic of silicon to allow high integration of optical devices in small footprints and due to the synergy of silicon with existing CMOS processes. Silicon photonics can be useful in a wide range of applications, comprising conventional long-distance communication, down to intra-chip communications and optical sensors in general.

Recent research has been aimed at developing several aspects of silicon photonics, for example efficient coupling systems from optical fibers to optical waveguides, low-loss optical waveguides, electro-optic modulators, all-optical devices, and tunable and reconfigurable devices. In addition to the above devices, tunable resonators are also of great relevance, since such resonators have played an important role as a versatile building block, enabling the demonstration of feasibility of several specific devices and functionalities in the silicon photonics platform, such as: tunable lasers, tunable filters, modulators, switches, reconfigurable devices, and sensors.

Amongst the main resonators reported in the technical literature for silicon photonics, the ring resonators and the photonic crystal nanobeam cavities are the most used structures, and have been widely used to demonstrate the feasibility of the devices previously mentioned. These structures have distinct and complementary characteristics regarding their functionalities, depending on the application.

As it is known to the person skilled in the art, nanobeam cavities can be designed to be ultra-compact and present high Free Spectral Range (FSR) and high Q-factor over a wide spectral window, whereas ring resonators present limited FSR. The FSR of ring resonators may be increased, up to a certain extent, by reducing their size. However, reducing the size of ring resonators results in a decreased Q-factor, which can negate the device utility for several applications. Further, nanobeam cavities present a band-pass nature behavior, whereas ring resonators present a band-stop behavior. Either behavior may be advantageous for specific applications.

In the present disclosure, a tunable and compact device is described, which features a specially designed structure which is able to merge the characteristics of the ring resonators and nanobeam cavities in a single device, as well as providing tunability of the resonant wavelength.

Figure 1:
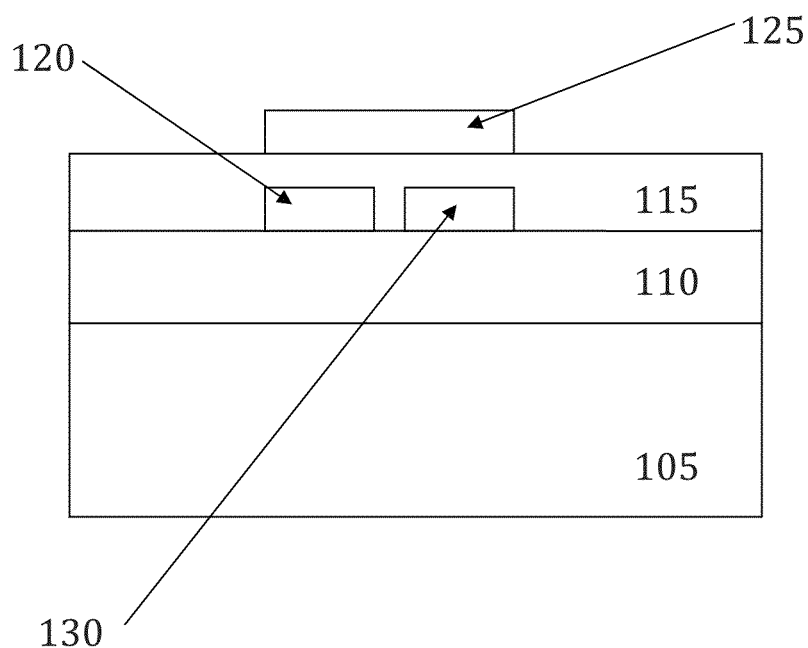
FIG. 1 illustrates schematically an embodiment of the devices of the disclosure.

FIG. 1 illustrates schematically an embodiment of the devices of the disclosure, from a cross-sectional view.

The device of FIG. 1 comprises a specially designed nanobeam cavity coupled to a bus waveguide and integrated with micro-heater atop. This structure can provide large FSR, high Q-factor, band-stop behavior, low power consumption, and CMOS compatibility.

For example, the device may be fabricated on a silicon substrate (105), comprising a first silicon oxide layer (110), and a second silicon oxide layer (115). The first oxide layer (110) may be normally present on the silicon substrate (105), while the second oxide layer (115) may be deposited on top of the first oxide layer (105).

The exemplary device of FIG. 1 further comprises two silicon elements (120, 130) an a top heater (125). The heater may be fabricated, for example, with NiCr. The two silicon elements comprise a bus waveguide (120) and a nanobeam cavity (130).

As understood to the person skilled in the art, the nanobeam cavity may comprise a mirror section. Such mirror section permits the reflection of optical waves within the structure, which are reinforced at a specific, resonant, wavelength. Launching an optical pulse into the periodic structure of the mirror section, it is possible to observe the behavior of the transmitted and reflected light. Such behavior may be analyzed through experiments or computational simulations. In such a way, it is possible to design the device to have a high reflectivity within a desired spectral window.

Figure 2:
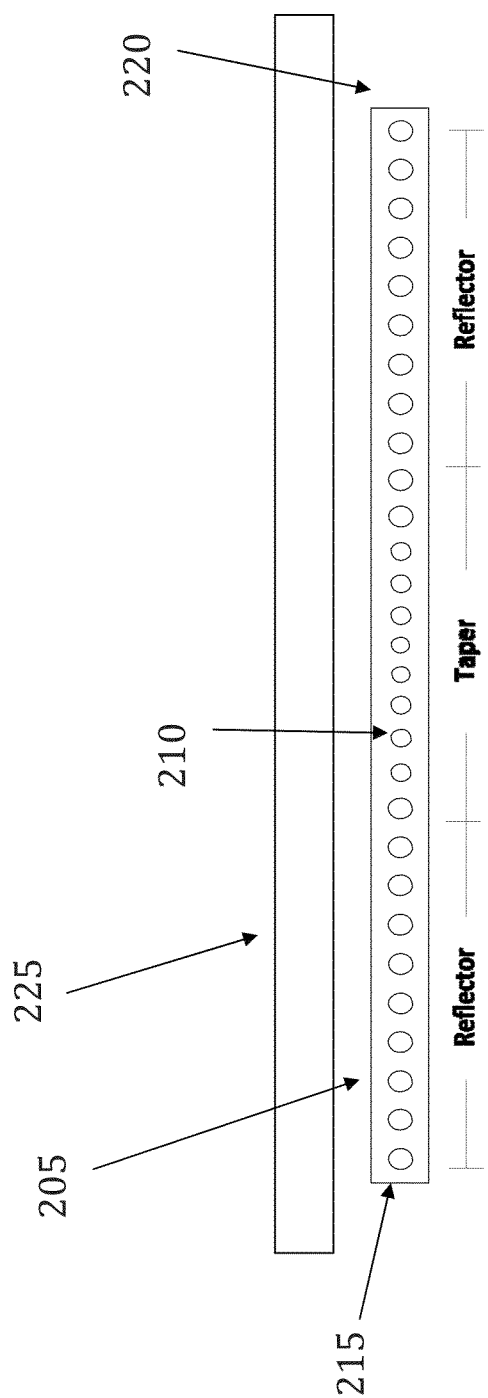
FIG. 2 illustrates an exemplary top view of the device.

FIG. 2 illustrates an exemplary top view of one embodiment of the device. The width of the nanobeam cavity (205), the diameter and number of the holes (210), as well as the distance between the holes (210), can be suitably chosen in order to introduce high reflectivity within a desired wavelength range. For example, within the range from 1400 nm to 1700 nm. The device may also comprise a bus waveguide section (225).

An example of values for the separation distance and diameter of the holes (210) is shown in Table 1 (mirror section), where the titles of each column will be understood by the person skilled in the art.

TABLE I

Design parameters.

|  | Cavity width | Bus waveguide | Coupling gap | Height |
|---|---|---|---|---|
| Cavity | 500 nm | 500 nm | 300 nm | 220 nm |

|  | Length constant | Hole diameter | Distance between holes |
|---|---|---|---|
| Mirror | 453.2 nm | a/2 | (0.9)a |

|  | Hole | Diameter (nm) | Distance between Tn and Tn − 1 |
|---|---|---|---|
| Taper Section | T1 | (a/2)(0.98) | (a)(0.9)(0.98) |
|  | T2 | (a/2)(0.92) | (a)(0.9)(0.92) |
|  | T3 | (a/2)(0.88) | (a)(0.9)(0.88) |
|  | T4 | (a/2)(0.84) | (a)(0.9)(0.84) |
|  | T5 | (a/2)(0.80) | (a)(0.9)(0.80) |
|  | T6 | (a/2)(0.76) | (a)(0.9)(0.76) |

In some embodiments, the periodic structure of the mirror section can act as a good reflector within a wide bandwidth of approximately 300 nm, between 1400 nm and 1700 nm. The number of holes (210) can play a role on the optimization of the reflection pattern.

In some embodiments, a mirror section with nine holes shows a high reflectivity within the wavelength range between 1400 nm and 1700 nm.

Further, the holes can have a tapered pattern along the cavity length, in order to smooth the reflected optical response. For example, a tapered pattern is visible in FIG. 2, as the holes on one end (215) of the waveguide (205) progressively decrease in diameter as they pass through the center (210), and then progressively increase in diameter approaching the opposite end (220).

The tapered pattern can reduce the scattering and the mode volume of the cavity resonant mode. The tapered pattern can also provide a single resonance within a large spectral window of high reflectivity, thereby increasing the Q-factor of the cavity.

In some embodiments, the parameters used to design the cavity correspond to those of Table 1, where the mirror and taper sections are parameterized in terms of a length constant, a. The cavity structure is symmetric with respect to its center; therefore, the taper section parameters are shown for half the length of the cavity. In Table 1, the column Distance between $T_n$ and $T_{n-1}$ represents the distance between a hole in the taper section ($T_n$) and the adjacent one $T_{n-1}$. For example, $T_1$ may be the first hole in the taper section, whereas $T_6$ may be the hole in the center of the cavity.

Figure 3:
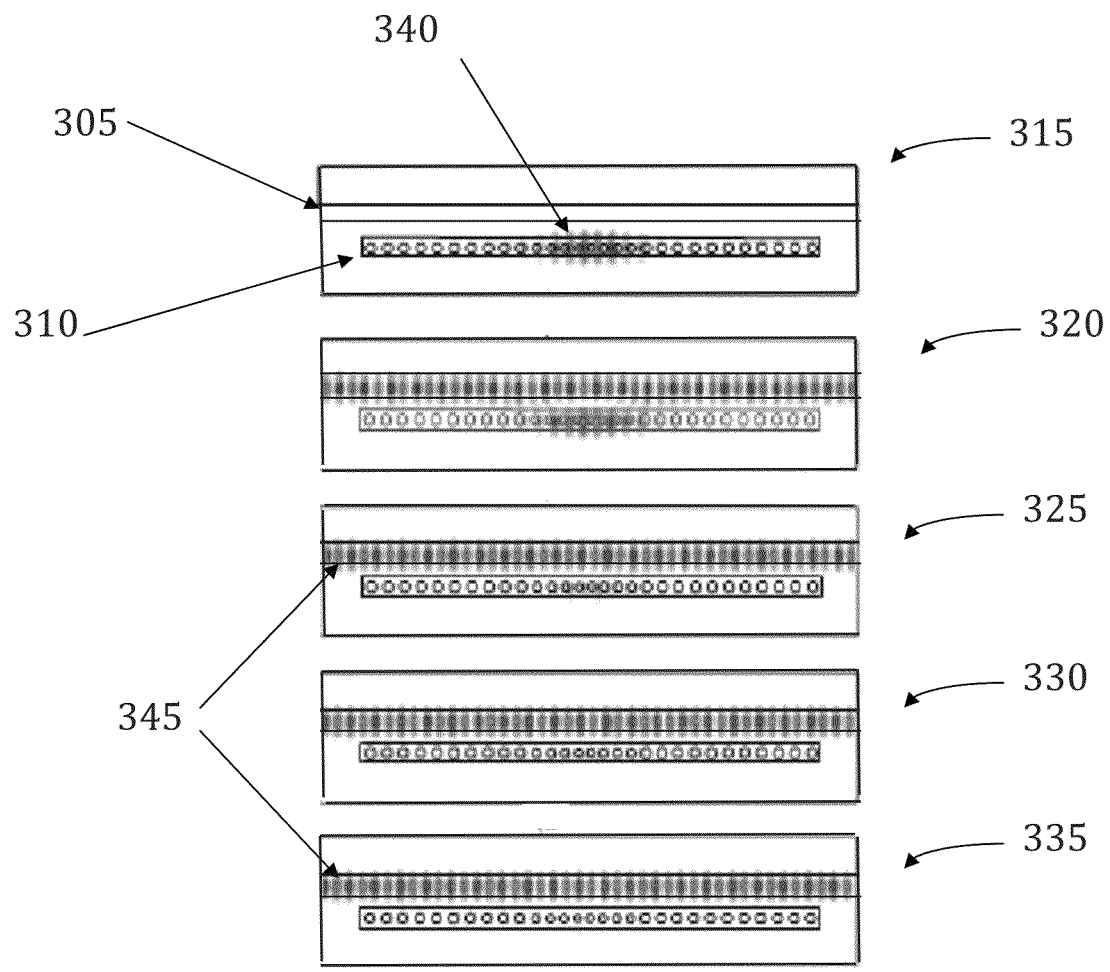
FIG. 3 illustrates a computational simulation of a resonant mode of one embodiment of the device.

FIG. 3 illustrates a computational simulation of the resonant optical mode for a resonant wavelength of one embodiment of the device, as a function of temperature.

The device of FIG. 3 comprises a bus waveguide (305) and a nanobeam cavity (310). The temperature of the different simulations is 0 K (315), 30 K (320), 60 K (325), 90 K (330), and 120 K (335). The effect of the temperature variation on the resonant mode is visible. The resonant mode is present in the nanobeam cavity (340), and there is no transmission of energy in the bus waveguide. As the person skilled in the art will understand, the energy is back reflected.

As temperature is increased, the resonant condition becomes invalid, and energy is transmitted through the bus waveguide, as visible, for example, in (345).

Based on these simulations, a micro-heater was designed atop of the nanobeam cavity to in order to fabricate a tunable nanobeam cavity, for example as in the device of FIG. 1. The design of the microheater is tailored so that the thermal operation of the heater does not interfere with the optical transmission, while at the same time allowing control of the temperature of the bus waveguide and nanobeam cavity. A linear response between temperature and resonant wavelength can then be achieved, in order to allow tunability of the cavity through control of the microheater.

In some embodiments, the resonance shift, in nanometers, is directly proportional to the temperature variation. For example, r=AT, where r is the resonance shift, T is the temperature variation, and A is a constant equal to 0.07 nm/K.

In some embodiments, the heater is fabricated with Nichrome and its dimensions are 2.5 μm wide, and 200 nm thick, which is enough to provide the heating needed to shift the resonance. In some embodiments, the thickness of the silicon dioxide cladding, between the silicon bus waveguide and the heater, is 1.5 μm.

The fabrication of the devices of the present disclosure can be divided in two distinct layers: the optical layer and the metal layer. The optical layer may be fabricated by direct e-beam lithography over a silicon-on-insulator substrate with negative tone e-beam resist, followed by dry etching. A layer of 1.5 μm silicon dioxide can be deposited by means of plasma-enhanced chemical vapor deposition (PECVD).

The metal layer can be built in two steps using aligned photolithography and positive photoresist with an inversion process. The first step comprises photolithography of the micro-heater, followed by 200 nm Nichrome deposition and then lift-off. The second step comprises the photolithography of the contact pads and of the feed line, followed by deposition of Ti/Au (for example, 5 nm/270 nm) and lift-off.

Figure 4:
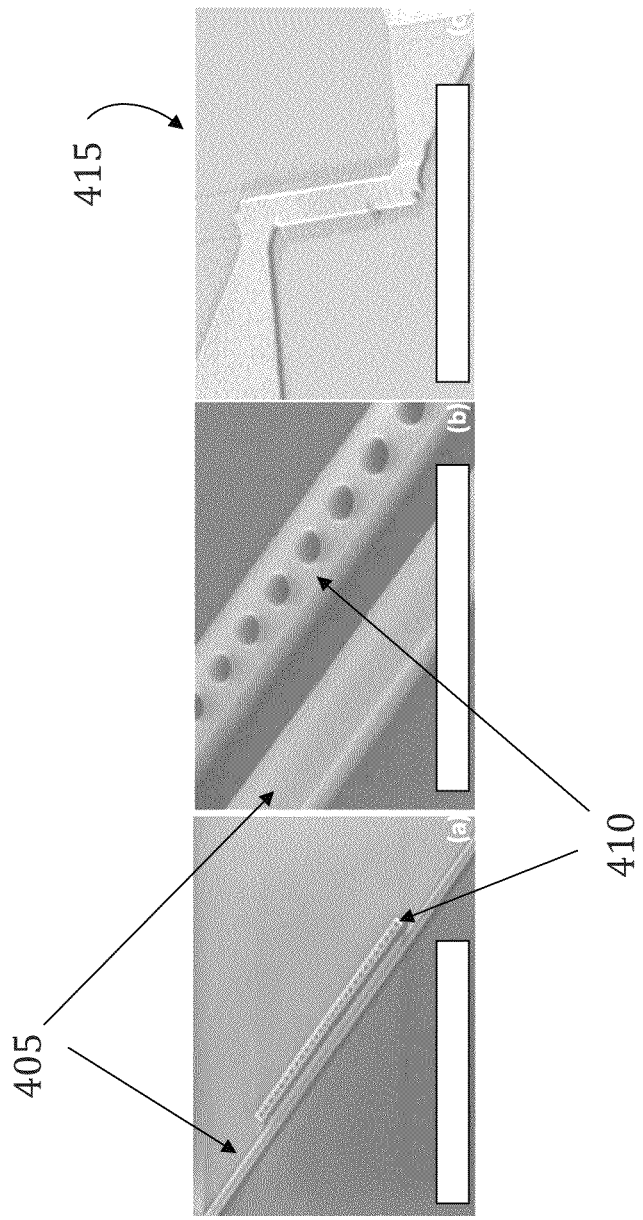
FIG. 4 illustrates an example of a fabricated device.

FIG. 4 illustrates an example of a fabricated device. The images in FIG. 4 were taken with scanning electron microscopy (SEM) after the device operating layer had been exposed by etching.

The bus waveguide (405) and nanobeam cavity (410) are visible at two different magnifications. The operating layers of the whole device are shown from a top view (415).

In some embodiments, the resistance of the nanoheater may be 400 Ohms.

During testing of the device, optical fibers may be connected at the input and output, and an electrometer may be used to measure the current in the microheater.

Figure 5:
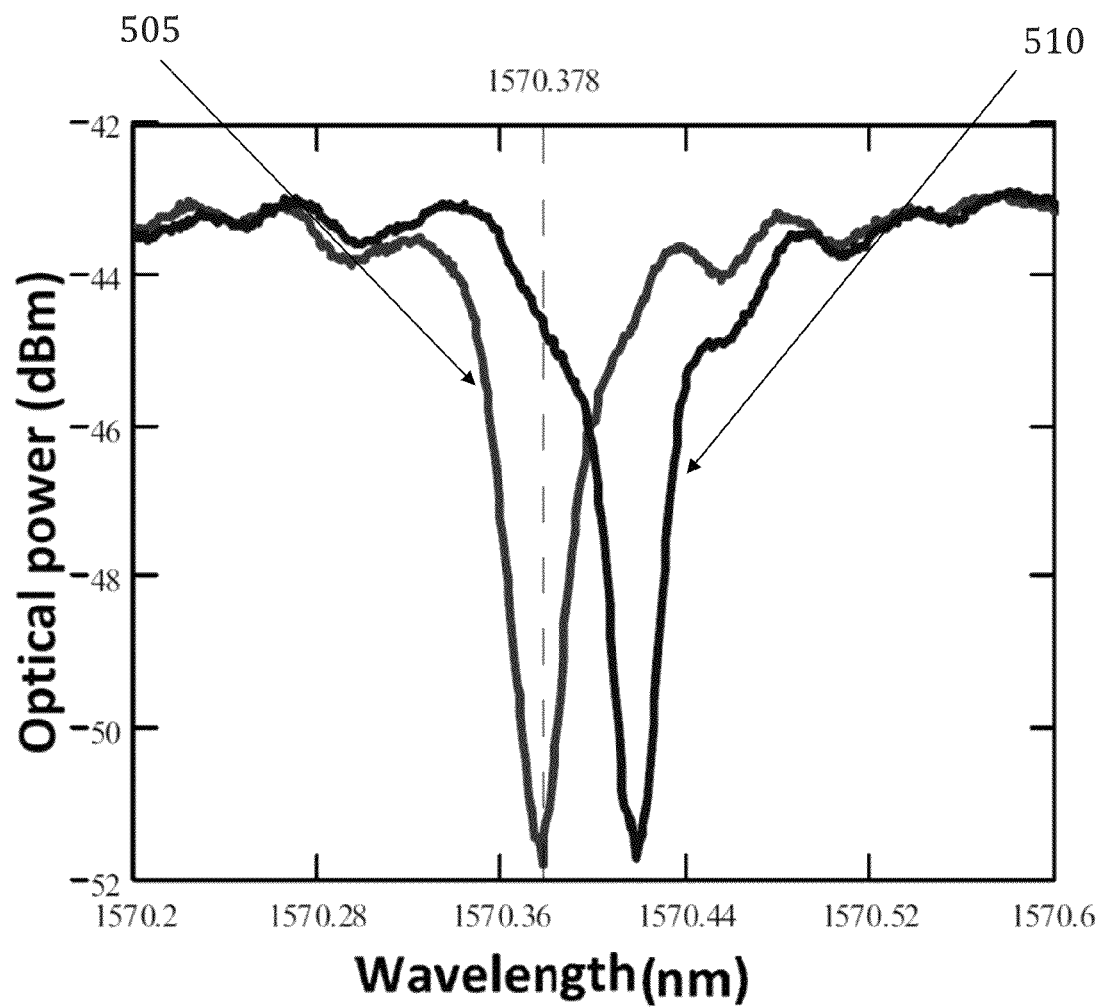
FIG. 5 illustrates a shift in resonance for a device.

FIG. 5 illustrates an exemplary shift in the optical response of one embodiment of a device as described in the present disclosure, as a function of wavelength, for two different values of electrical power applied to the heater. The response with zero electrical power (505) is shifted relative to the response with applied optical power (510). In this example, the applied power is 100 μW, and the resonant wavelength without applied power is 1570.38 nm. The Q factor was calculated as 50,000.

As understood by the person skilled in the art, further improvements in Q factor may be achieved by smoothening the sidewalls of the devices of the present disclosure.

In several embodiments of the disclosure, the devices have an almost linear dependence of the resonant shift with respect to the electrical power, for example with a proportionality constant of 0.35 nm/mW.

In some embodiments, a maximum current of approximately 10.5 mA, i.e., approximately 45 mW could be carried by the device, thereby providing a maximum shift in wavelength of approximately 15 nm. In other embodiments, the maximum current, electrical power, and maximum shift of the wavelength may be greater.

The optical signal of the devices of the present disclosure may be switched into and out of resonance to form a modulated optical signal. For example, a square signal may be applied to the device. In some embodiments, the rise and fall time of the response signal are approximately 15 µs, being primarily limited by the heat diffusion speed in the silicon dioxide cladding layer.

It is known to the person skilled in the art that nanobeam cavities, when fabricated with a high Q factor and low modal volume, may present a non-linear behavior even for low optical powers, showing a bi-stable behavior due to thermo-optic effects. The devices of the present disclosure may also exhibit an optical bi-stable behavior.

Figure 6:
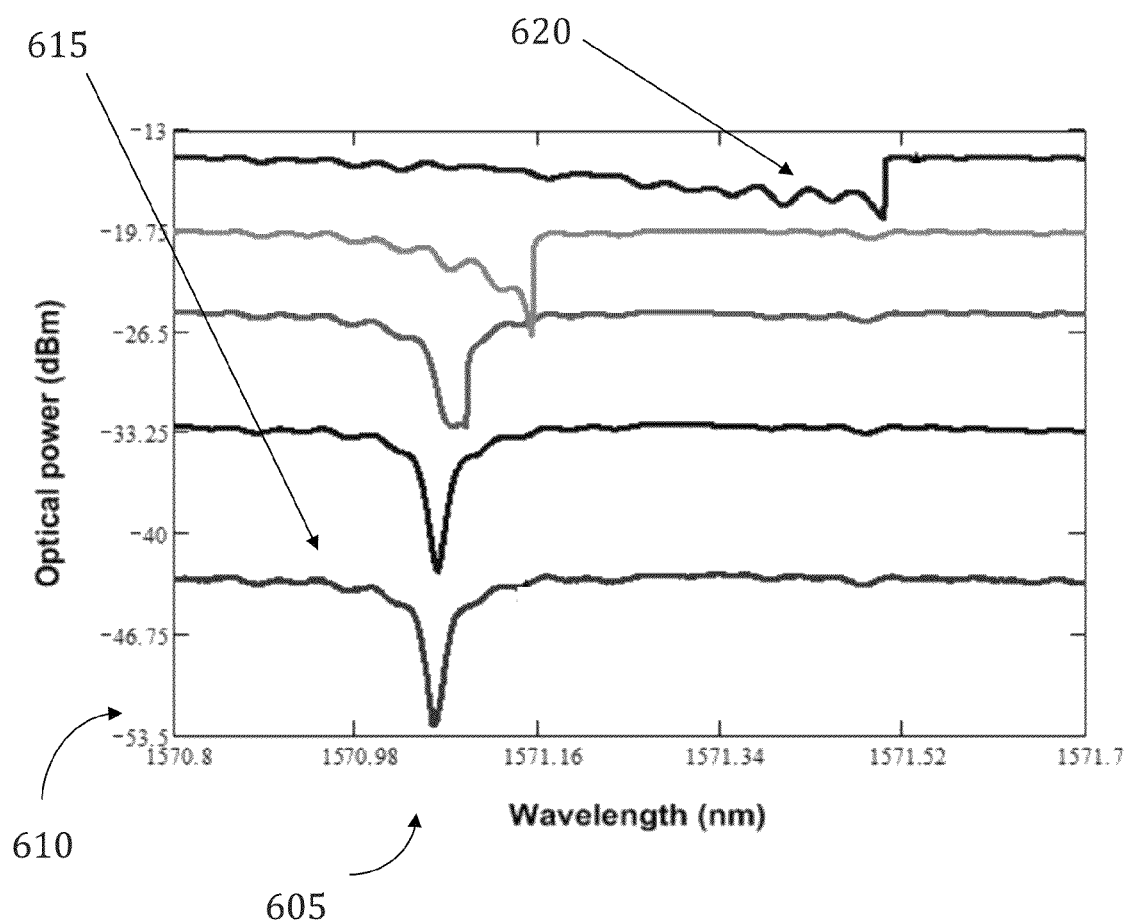
FIG. 6 illustrates the optical response of an exemplary device for several levels of optical power.

FIG. 6 illustrates the optical response of an exemplary device for several levels of optical power, where the transition from the linear to the non-linear regime can be observed. In FIG. 6, a red-shift for the resonance can also be seen, as the optical power is increased, showing thermo-optical bi-stability.

In FIG. 6, the x axis (605) is the wavelength, while the y axis is the optical power (610). For example, the resonant frequency of curve (615) is red-shifted compared to that of curve (620).

In several embodiments of the present disclosure, once the bi-stable resonance is excited, it may be possible to tune the bi-stable behavior without increasing the optical power. It may also be possible to tune the resonant wavelength by changing the temperature while keeping the optical power constant. In this way, the bi-stable behavior can be tuned while the optical power is constant. Control of the bi-stable behavior can be achieved thermally.

The devices of the present disclosure may have several applications in telecommunications, spectroscopy and sensing.

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art a complete disclosure and description of how to make and use the embodiments of the gamut mapping of the disclosure, and are not intended to limit the scope of what the inventor/inventors regard as their disclosure.

Modifications of the above-described modes for carrying out the methods and devices herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or devices, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A device comprising:
    a substrate;
    a nanobeam cavity element on the substrate, wherein the nanobeam cavity element comprises a row of periodically spaced holes, wherein the row of periodically spaced holes has a tapered pattern;
    a waveguide element on the substrate;
    a spacing element on the substrate, separating the waveguide element from the nanobeam cavity element;
    a spacing layer, covering the nanobeam cavity element, covering the waveguide element, and covering the spacing element; and
    a heater element on the spacing layer.

2. The device of claim 1, wherein the tapered pattern comprises:
    a beginning region, wherein the holes have substantially the same diameter;
    a beginning middle region, wherein the holes have a decreasing diameter;
    an ending middle region, wherein the holes have an increasing diameter; and
    an ending region, wherein the holes have substantially the same diameter,
    wherein the diameter of the holes in the beginning and ending regions is substantially the same.

3. The device of claim 1, wherein the substrate comprises a silicon layer and a silicon dioxide layer.

4. The device of claim 1, wherein the nanobeam cavity element and the waveguide element are made of silicon.

5. The device of claim 4, wherein the spacing element and spacing layers are made of silicon dioxide.

6. The device of claim 1, wherein the heater element is made of Nichrome.

7. The device of claim 1, wherein width and thickness of the nanobeam cavity element, diameter and number of the holes, distance between the holes, width and thickness of the waveguide element, and width and thickness of the spacing element are selected in order for the device to have high reflectivity and/or a high Q-factor at a desired resonant wavelength.

8. The device of claim 7, wherein the desired resonant wavelength is between 1400 and 1700 nm.

9. A method comprising:
    providing the device of claim 1;
    applying a current to the heater element, thereby increasing a temperature of the nanobeam cavity element and waveguide element; and
    shifting a resonant wavelength of the nanobeam cavity element by the temperature increase.

10. The method of claim 9, wherein the shift in resonant wavelength is linear with respect to the temperature increase.

11. A method comprising:
    operating the device of claim 1 in a bi-stable condition;
    applying a current to the heater element, thereby increasing a temperature of the nanobeam cavity element and waveguide element; and
    shifting a resonant frequency of the nanobeam cavity element by a temperature increase.

12. The method of claim 11, further comprising keeping an applied optical power constant.

* * * * *